United States Patent [19]

Margerum

[11] Patent Number: 4,928,724
[45] Date of Patent: May 29, 1990

[54] AUTOMATIC WET TANK DRAIN VALVE

[76] Inventor: Wayne R. Margerum, 15 Alden Ave., Delran, N.J. 08075

[21] Appl. No.: 331,595

[22] Filed: Mar. 30, 1989

[51] Int. Cl.⁵ .............................................. B01D 5/00
[52] U.S. Cl. .................................................... 137/204
[58] Field of Search ................................ 137/203, 204

[56] References Cited

U.S. PATENT DOCUMENTS

| 3,101,091 | 8/1903 | Schultz | 137/204 |
| 4,409,005 | 10/1983 | McKendrick | 137/203 X |

FOREIGN PATENT DOCUMENTS

| 690862 | 4/1953 | United Kingdom | 137/204 |
| 1063362 | 3/1967 | United Kingdom | 137/203 |

Primary Examiner—Alan Cohan
Attorney, Agent, or Firm—Charles F. Duffield

[57] ABSTRACT

Valving apparatus for use in automotive vehicles which employ an air pressure system utilizing an air pressure tank, a wet tank interconnected to the air pressure tank for accumulating moisture and a manual valving system for draining moisutre from the wet tank. The manual valve is replaced by an automatic valve which has an inlet port connected to the drain line from the wet tank and an outlet port vented to atmosphere and operable between open and closed positions. The valve actuation means is interconnected to the electrical system of the vehicle and also to the pressure system of the vehicle and is operable to move the valving means to a closed position during operation of the vehicle and to an open position during vehicle shut down to automatically drain moisture from the wet tank while the vehicle is idle.

4 Claims, 3 Drawing Sheets

AUTOMATIC WET TANK DRAIN VALVE

BACKGROUND OF INVENTION

The present invention relates to apparatus for draining of moisture from the air pressure system of vehicles and, more specifically, to apparatus for automatically draining the moisture upon shut down of the vehicle.

A common form of braking system upon large trucks is that truck which operates upon air pressure. The truck engine operates an air compressor which provides the pressure for the braking system. The air pressure is stored generally in a pressure storage tank appropriately located within the vehicle in order that a constant pressure supply may be available.

During operation of the air compressor, air is pulled from the atmosphere and compressed by the air compressor. Atmospheric air contains moisture which, upon compression, causes the moisture to condense. Throughout continued use of the pressure system, the moisture will build up in the form of liquid in the pressure storage tank.

Continued presence of moisture in the air brake system can cause considerable harm to the system and even brake failure. For example, the moisture can cause deterioration of rubber seals and the like. Additionally, in cold weather, where the moisture has migrated into the pressure lines and other aspects of the braking system, it can freeze causing malfunction or total failure of the braking system.

For the foregoing reasons, it is essential that the moisture, which eventually accumulates in the pressure storage tank, be drained from the tank before it builds to a level to migrate into the remainder of the braking system. A conventional means for removing moisture from the braking system and, more particularly, from the pressure storage tank is to utilize a separate tank positioned below the pressure storage tank and interconnected with the pressure storage tank by means of a check valve. This separate tank, known as a wet tank, will draw the collecting liquid or moisture from the pressure storage tank by means of gravity into the wet tank.

During normal operation, the wet tank, which has a drain valve in the bottom thereof, operates with the drain valve closed and the moisture accumulating in the pressure storage tank will drain by gravity into the wet tank. Periodically and usually at the end of every day when the vehicle is shut down, the drain valve on the wet tank is manually opened. The check valve between the pressure storage tank and wet tank will then go into a closed position and the moisture which has accumulated in the wet tank, by means of the pressure already present therein, will blow the moisture out of the wet tank and purge the system.

The foregoing system for draining of moisture from the air braking system of a vehicle, if operated properly, will be effective. However, one of the severe drawbacks of such a system is that the operators of the vehicle forget to drain the wet tank. After a period of time, the wet tank will fill and the moisture will back up into the pressure storage tank and ultimately into the system with grave consequences.

What is needed in the industry is a means by which the wet tank can automatically be drained whenever the vehicle is in a shut down mode. Equally important however is that such an automatic draining system be of the type and nature that a failure of the system to drain during shut down of the vehicle will work in a fail-safe mode, i.e. upon a failure of the drain system to work automatically pressure will not be released from the pressure system which would, of course, render the braking system inoperative and thus create a dangerous situation.

SUMMARY OF INVENTION

The automatic wet tank drain valve assembly of the present invention overcomes the difficulties of the manual wet tank drain valves heretofore used. In accordance with the invention, a valve assembly is utilized which incorporates a valve body having a drain inlet and a drain outlet interconnected with a piston bore. A valve piston is operable within the valve bore and works in conjunction with a piston shut off spring to move between open and closed positions. The drain inlet port is interconnected to the drain outlet of the wet tank. The drain outlet port is communicated to the atmosphere.

An electric solenoid valve and interrelated air cylinder are utilized to actuate the valve assembly. The air cylinder is in communication with the air pressure system of the vehicle through the electric solenoid valve. The air cylinder includes a piston and associated piston rod projecting from the air cylinder. A spring is positioned between the piston and a wall of the air cylinder in a manner that the piston and associated piston rod is retracted when air pressure is removed from the air cylinder.

The electric solenoid valve is of the type that, when energized, the air pressure supplied to the air cylinder is removed. In a reverse manner when the electric solenoid valve is deenergized, air pressure is permitted to be applied to the air cylinder causing the piston and associated piston rod to extend.

The electric solenoid valve and associated air cylinder are secured to the valve assembly with the piston rod extending into and operable to move the valve piston of the valve assembly in a manner such that when the piston rod is extended, it applies a counter pressure against the piston shut off spring. In this manner, whenever the electric solenoid valve is energized, air pressure in the air cylinder is relieved and the piston rod retracted whereupon the piston shut off spring moves the valve piston to the shut off position thus cutting off draining of the wet tank during vehicle operation. In the reverse manner, whenever the electric solenoid valve is deenergized, i.e. the vehicle ignition switch turned off, the air pressure within the vehicle system extends the piston rod moving the valve piston against the piston shut off spring pressure to open the valve assembly to drain the wet tank.

Other objects and advantages of the automatic wet tank drain valve assembly of the present invention will become apparent from the detailed description thereof which follows taken in conjunction with the drawings.

DETAILED DESCRIPTION OF INVENTION

Figure 1:
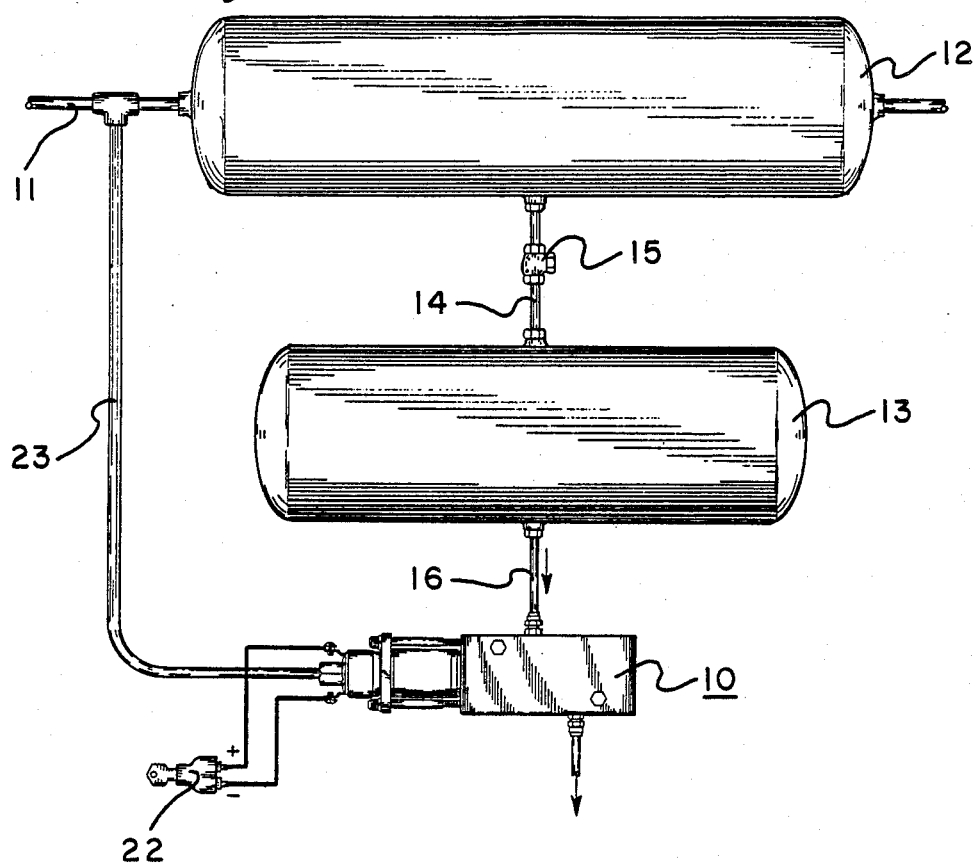
FIG. 1 is an elevational view of the valve assembly of the present invention in conjunction with a storage pressure tank and wet tank showing the various pneumatic plumbing involved.

FIG. 1 of the drawings illustrates the wet tank drain valve assembly 10 of the present invention shown in its operating configuration in conjunction with certain other features of an air pressure braking system commonly in use in large trucks and the like. The system includes a high pressure air supply line 11 which leads to a pressure storage tank 12 in a conventional manner. Positioned below the pressure storage tank 12 is a conventional wet tank 13. The wet tank 13 is interconnected to the pressure storage tank 12 by means of ah air pressure line 14 operating through a check valve 15.

The wet tank drain valve assembly 10 is connected through the bottom of the wet tank 13 by means of a pressure line 16.

Figure 2:
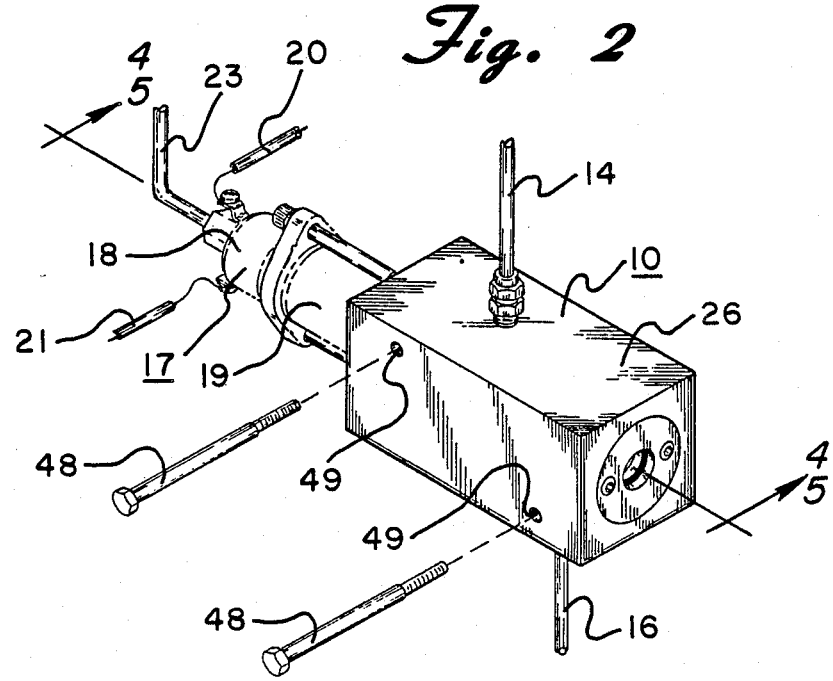
FIG. 2 is a perspective view of the automatic wet tank drain valve assembly of the present invention showing the various pneumatic plumbing associated therewith.

As shown more in detail in FIG. 2 of the drawings, the wet tank drain valve assembly 10 includes a valve body 26. Attached to the valve body 26 is a valve actuator assembly 17. The valve actuator assembly 17 includes an electric solenoid valve 18 and an air cylinder 19 interpositioned between the electric solenoid valve 18 and the valve body 26.

The electric solenoid valve 18 includes two leads 20 and 21 which, as shown in FIG. 1 of the drawings, are interconnected to the vehicle ignition switch 22. Additionally, the electric solenoid valve 18 has interconnected thereto an auxiliary pressure line 23 which leads to the main pressure system of the vehicle.

Figure 3:
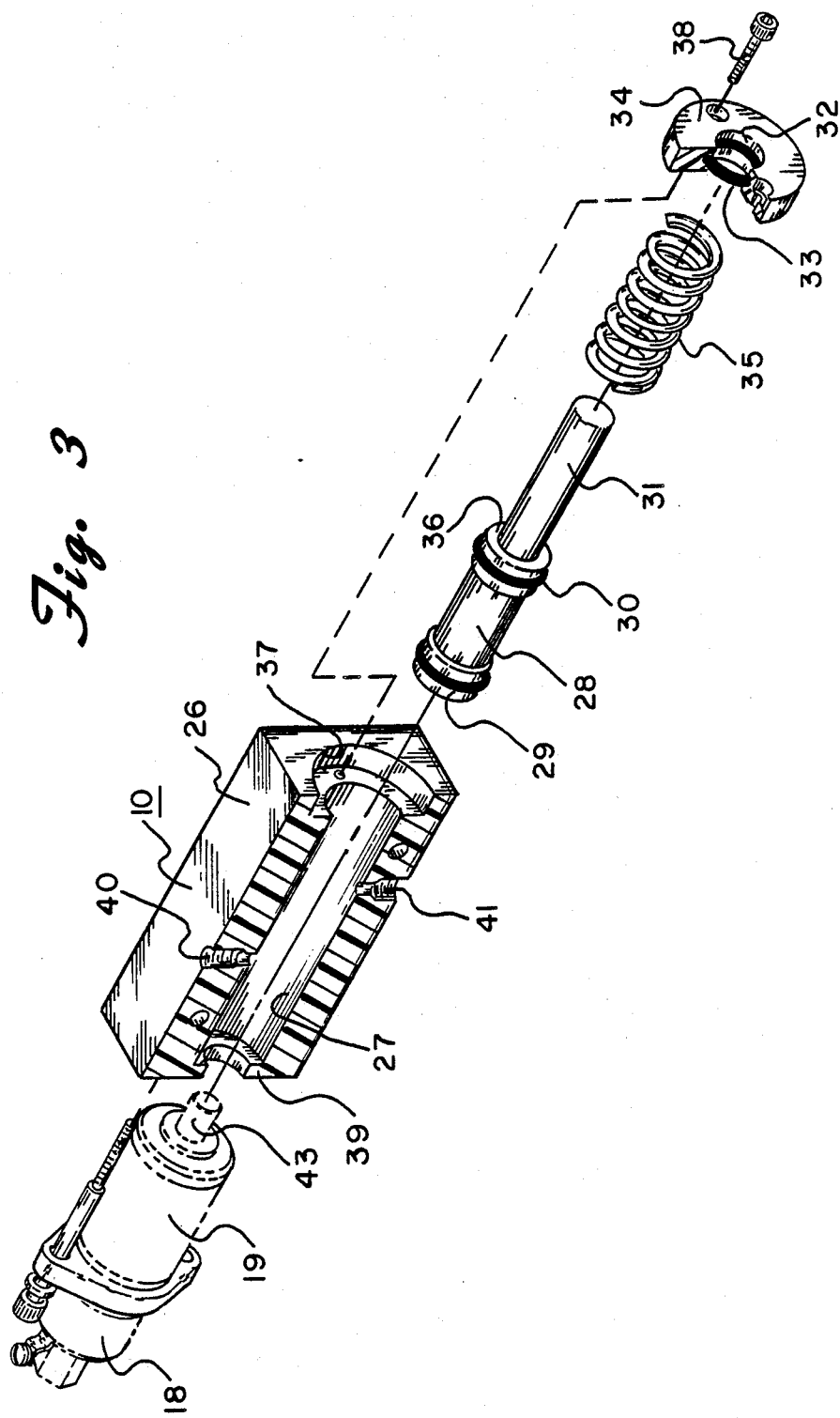
FIG. 3 is an exploded perspective view of the wet tank drain valve assembly of the present invention partially in section.
Figure 4:
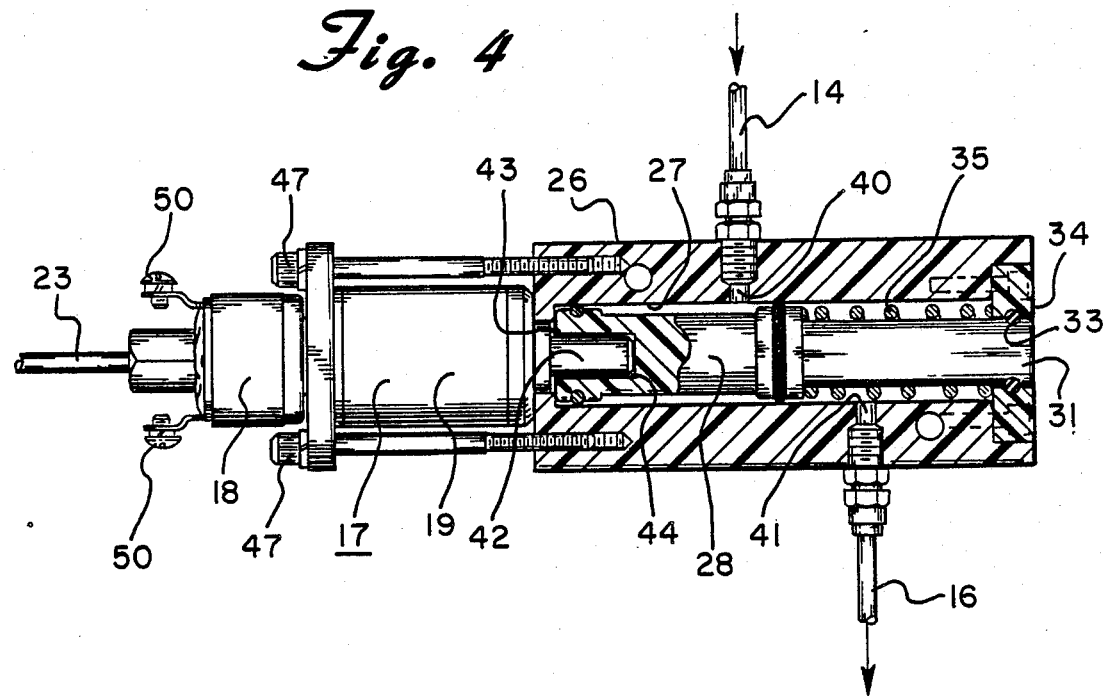
FIG. 4 is an elevational view of the wet tank drain valve of the present invention partially in section showing the valve assembly in the closed position.
Figure 5:
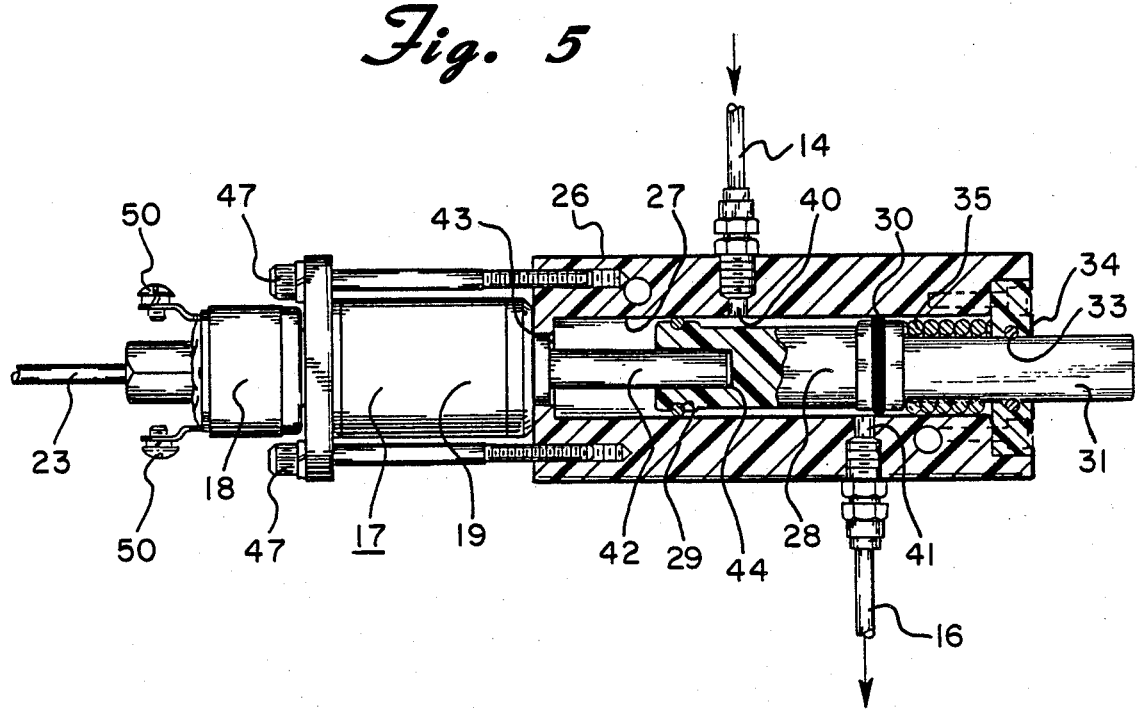
FIG. 5 is an elevational view of the wet tank drain valve assembly of the present invention partially in section showing the valve assembly in the open or drain position.

Referring now to FIGS. 3-5 of the drawings, the details of the wet tank drain valve assembly 10 are illustrated. The wet tank valve assembly 10 includes a valve body 26 formed of a suitable plastic or metallic material. Positioned within the valve body 26 is a piston bore 27 which is adapted to receive a movable valve piston 28. The valve piston 28 includes a sealing O-ring 29 at one end thereof and a like sealing O-ring 30 at the opposite end thereof.

The valve piston 28 includes, extending from one end thereof, a valve piston guide 31 which operates in conjunction with an appropriate bore 32 and sealing O-ring 33 positioned centrally with an end cap 34.

A piston shut off spring 35 is positioned between the end cap 34 over the valve piston guide 31 and abuts a shoulder 36 on the valve piston 28. When in assembled position as shown in FIGS. 4 and 5 of the drawings, the end cap 34 is held in place within a bore 37 in the valve body 26 by appropriate cap screws 38. In this position, the piston shut off spring 35 urges the valve piston 28 against an abutment wall 39.

As shown in FIGS. 4 and 5 of the drawings, the valve body 26 includes a drain inlet port 40 in the upper left hand portion of the valve body in communication with the piston bore 27. In a like manner, there is a drain outlet port 41 provided in the lower right hand portion of the piston bore in communication with the piston bore 27. Thus, as may be seen in FIG. 4, when the valve piston 28 is in the left most position as is urged by the pressure of the piston shut off spring 35, communication between the drain inlet port 40 and the drain outlet port 41 is blocked. In the converse, when the valve piston 28 is moved to its right hand position and compresses the piston shut off spring 35, there is communication between the drain inlet port 40 and drain outlet port 41 which would permit any fluid in the wet tank 13 to drain through the wet tank drain valve assembly 10 to atmosphere.

Actuation of the valve piston 28 within the valve body 26 is achieved by means of a valve actuating assembly 17. The valve actuating assembly 17 includes an electric solenoid valve 18 and its associated air cylinder assembly 19.

The air cylinder assembly 19 utilizes therein a piston (not shown) and an associated piston rod 42 which projects from the air cylinder 19. The end of the piston rod 42 extends through an aperture 43 in the left hand end of the valve body 26 and fits within a bore 44 in the left hand end of the valve piston 28.

The valve assembly 17 is constructed of such a nature that the assembly includes a compression spring (not shown) between the valve piston (not shown) and the right hand most portion of the air cylinder 19. The compression spring serves, when there is no air pressure applied to the air cylinder assembly 17, to cause the piston and its associated piston rod 42 to retract or move to the left hand position. This is as illustrated in FIG. 4 and the piston shut off spring 35 will cause the valve piston 28 to move to the closed or shut off position as shown in FIG. 4.

The electric solenoid valve 18 is interposed between the air cylinder assembly 17 and the air pressure supply line 23. The electric solenoid valve 18 is of the type that, when energized, it will shut off the air pressure from the air supply line 23 to the air cylinder assembly 17. In the converse, whenever the electric solenoid valve 18 is deenergized, air pressure is permitted to pass through the electric solenoid valve 18 to the head of the piston within the air cylinder assembly 17. As this occurs, the pressure upon the piston will move the piston and its associated piston rod 42 to the right against the compression of the piston shut off spring 35 to thus move the valve piston 28 to the open position as shown in FIG. 5. The counteracting pressure generated within the air cylinder assembly 17 upon the application of air pressure thereto is of a force greater than that applied in the opposite direction by the piston shut off spring 35 for a pressure of 70 PSI or greater and thus overcomes the piston shut off spring 35 to move and maintain the valve piston 28 in the open or drain position as shown in FIG. 5.

The air cylinder assembly 17 is held in place upon the valve body 26 by means of two cap screws 47. In a like manner, the entire wet tank drain valve assembly 10 may be appropriately mounted upon the frame or other member of a vehicle by means of two cap screws 48 passing through drillings 49 in the valve body 26.

The electric solenoid valve 18 includes two electric terminals 50. As illustrated in FIG. 1 of the drawings, these terminals are connected through the ignition switch of the vehicle upon which the wet tank drain valve assembly is mounted.

In operation, as the operator of the vehicle starts the vehicle, energization of the electric solenoid valve 18 will cut off pressure from the air supply line 23 and, simultaneously, open a cylinder vent (not shown) to the air cylinder. As this occurs, the compression spring within the air cylinder 17 will cause the piston and its associated piston rod 42 to retract to the left. As this occurs, the piston shut off spring 35 will move the valve piston 28 to the left bringing the valve piston 28 into the shut off position. In this condition normal operation of the brake system can occur in that any moisture within the pressure storage tank 12 will pass through the check valve 15 into the wet tank 13 which will become pressurized.

When the operator shuts down the vehicle, i.e. turns off the ignition switch 22, the electric solenoid valve 18 will become deenergized. As this occurs, pressure from the pressure supply line 23 will be applied through the electric solenoid valve 18 to the air cylinder assembly 17 causing the piston therein and associated piston rod 42 to move to the right to compress the piston shut off spring 35 and thus bring the piston valve 28 to the drain position. At this position, any moisture within the wet tank 13 will be drained through the valve assembly to the atmosphere while the check valve 15 will prevent depressurization of the pressure storage tank 12. The system will remain in this state at rest so long as there is pressure in the pressure storage tank 12.

The system is designed to be fail-safe. In the event that there is a loss of pressure in the system, the wet tank drain valve assembly will return to its shut off or closed preventing any further loss of pressure.

From the foregoing, it will be appreciated that the wet tank drain valve assembly of the present invention provides an efficient and fail-safe system for the replacement of manual drain valves in a manner such that the moisture within the wet tank of the system will automatically be drained upon shut down of the vehicle and thus protect the system against the inadvertent failure to properly drain the system at regular intervals.

The wet tank drain valve assembly of the present invention has been described in the specification in respect to a particular embodiment thereof as shown in the drawings. Other variations and modifications of the invention as a result thereof may become apparent to those skilled in the art and accordingly the description of the invention in respect to a specific embodiment is not intended to be limiting of the scope of the invention but the scope thereof is to be interpreted in view of the appended claims.

What I claim is:

1. Apparatus for use in an automotive air pressure system employing an air pressure tank, a wet tank for accumulating moisture within the system and drain line and manual valving for draining the moisture from the wet tank, the improvements providing for automatic draining of the wet tank upon vehicle shut down comprising:

valving means having an inlet port connected to the drain line and an outlet port vented to atmosphere and including a valve body having a piston therein, a valve piston movable within the valve bore between open and closed positions in respect to the inlet and outlet ports and a piston shut off spring urging the piston into closed position; and fluid valve actuation means operably connected to the valving means and adapted to move the valving means to closed position during vehicle operation and to open position during vehicle shut down and wherein the fluid valve actuation means during vehicle shut down applies a counter pressure against the piston shut off spring to cause the valve piston to move to open position.

2. The apparatus of claim 1 wherein the valve actuation means includes an air cylinder and piston rod interconnected to the vehicle air pressure system to apply the counter pressure to the piston shut off spring during vehicle shut down.

3. The apparatus of claim 2 wherein the valve actuation means further includes an electric solenoid valve between the vehicle pressure system and the air cylinder and energized by the vehicle electrical system and operable to apply the vehicle air pressure to the air cylinder only when the electric solenoid valve is disengaged.

4. The apparatus of claim 3 wherein the air cylinder includes spring means to continuously oppose the counter pressure of the air cylinder and piston rod upon the piston shut off spring but of a lesser magnitude than the counter pressure during the deenergization of the electric solenoid valve to provide a fail-safe arrangement.

* * * * *